US008047519B2

(12) United States Patent
Rienecker

(10) Patent No.: US 8,047,519 B2
(45) Date of Patent: Nov. 1, 2011

(54) DEVICE FOR HOLDING A PISTON IN A SYSTEM FOR COATING PISTONS

(75) Inventor: Joachim Rienecker, Geiselbach (DE)

(73) Assignee: MAHLE International GmbH, Stuttgart (DE)

( * ) Notice: Subject to any disclaimer, the term of this patent is extended or adjusted under 35 U.S.C. 154(b) by 691 days.

(21) Appl. No.: 11/991,237

(22) PCT Filed: Aug. 31, 2006

(86) PCT No.: PCT/DE2006/001530
§ 371 (c)(1), (2), (4) Date: Aug. 6, 2008

(87) PCT Pub. No.: WO2007/025532
PCT Pub. Date: Mar. 8, 2007

(65) Prior Publication Data

US 2009/0278298 A1 Nov. 12, 2009

(30) Foreign Application Priority Data

Sep. 1, 2005 (DE) ......................... 10 2005 041 404

(51) Int. Cl.
*B23Q 3/00* (2006.01)

(52) U.S. Cl. ......................... 269/290; 269/310; 269/309

(58) Field of Classification Search .................. 269/290, 269/900, 309–310, 254 CS
See application file for complete search history.

(56) References Cited

U.S. PATENT DOCUMENTS

| | | | |
|---|---|---|---|
| 3,460,239 A | 8/1969 | Nix | |
| 5,284,229 A | 2/1994 | Logan et al. | |
| 5,435,873 A | 7/1995 | Penrice | |
| 5,534,126 A | 7/1996 | Stadler et al. | |
| 5,971,382 A * | 10/1999 | Scheufler, Jr. | 269/47 |
| 6,019,357 A | 2/2000 | Bartsch et al. | |
| 6,083,322 A | 7/2000 | Burns et al. | |
| 6,161,826 A * | 12/2000 | Forrer | 269/309 |
| 6,357,735 B2 * | 3/2002 | Haverinen | 269/43 |
| 6,371,469 B1 * | 4/2002 | Gray | 269/48.1 |
| 7,036,810 B2 * | 5/2006 | Wal, III | 269/296 |
| 7,182,328 B2 * | 2/2007 | Teague et al. | 269/305 |
| 7,204,481 B2 * | 4/2007 | Sears et al. | 269/266 |
| 2004/0217012 A1 | 11/2004 | Gramm | |
| 2005/0056541 A1 | 3/2005 | Oikawa et al. | |
| 2009/0278298 A1 * | 11/2009 | Rienecker | 269/290 |

FOREIGN PATENT DOCUMENTS

| | | |
|---|---|---|
| DE | 504 289 | 8/1930 |
| DE | 1 139 411 | 11/1962 |
| DE | 28 54 359 | 10/1980 |
| DE | 86 07 441 | 9/1990 |
| DE | 697 09 306 | 7/2002 |
| DE | 101 40 934 | 2/2003 |

* cited by examiner

*Primary Examiner* — Lee D Wilson
(74) *Attorney, Agent, or Firm* — Collard & Roe, P.C.

(57) ABSTRACT

The invention relates to a device (2), in a plant for coating pistons, for holding a piston (1) of an internal combustion engine, comprising an aligning piece (7), which is arranged on a surface (3) of the device (2) in the direction of the axis (17) of the piston (1) in an elastically flexible manner and which comprises two opposing surfaces resting on the inner surface of the gudgeon pin boss (18) of the piston (1) conically tapering in the direction of the piston crown. A simple construction of the piston holder which permits a fault-free and even coating of the piston which can be rapidly and simply fixed to the piston is achieved.

3 Claims, 1 Drawing Sheet

DEVICE FOR HOLDING A PISTON IN A SYSTEM FOR COATING PISTONS

CROSS REFERENCE TO RELATED APPLICATIONS

Applicant claims priority under 35 U.S.C. §119 of German Application No. 10 2005 041 404.4 filed Sep. 1, 2005. Applicant also claims priority under 35 U.S.C. §365 of PCT/DE2006/001530 filed Aug. 31, 2006. The international application under PCT article 21(2) was not published in English.

BACKGROUND OF THE INVENTION

The invention relates to a device for holding a piston in a system for coating pistons, according to the preamble of claim 1.

A system for coating pistons is known from the U.S. patent having the U.S. Pat. No. 5,435,873, in which the pistons are held by an immersion piston attached to the axle of rotation of an electric motor, the piston-shaped end and the sleeve-shaped end of which immersion piston are held at a distance from one another by a pressure spring, and are introduced into a pin bore of the piston, in each instance. The electric motor sets the pistons into rotation, so that the pistons, each disposed in a separate tub for accommodating the coating material, in each instance, are coated. It is a disadvantage in this connection that the known piston holder has a very complicated structure, and that great effort is required to attach the piston to the holder.

SUMMARY OF THE INVENTION

It is the task of the invention to avoid the disadvantages of the state of the art.

This task is accomplished with the characteristics standing in the characterizing part of the main claim. Practical embodiments of the invention are the object of the dependent claims.

BRIEF DESCRIPTION OF THE DRAWINGS

An exemplary embodiment of the invention will be described in the following, using the drawings. These show.

DETAILED DESCRIPTION OF THE EMBODIMENTS

Modern engines are often equipped with pistons made from aluminum, whereby the pistons are coated with iron in order to reduce wear. This is generally done using an electrolytic coating method. A coating system suitable for this purpose consists of multiple coating cells that each have a larger number of piston holders 2, on which the pistons are attached.

Figure 1:
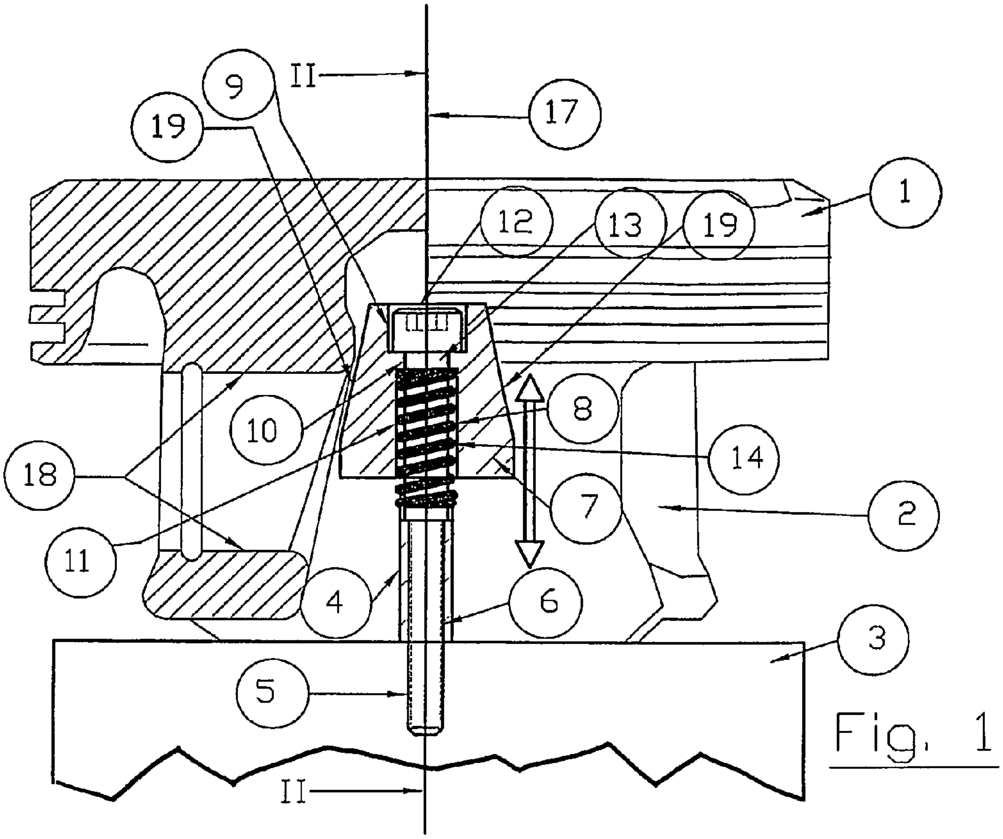
FIG. 1 a piston holder of a coating system for pistons, according to the invention, in section, and FIG. 2 a section through the piston holder along the line II-II in FIG. 1.

The holder 2 of a piston 1 shown in FIG. 1 consists of a contact surface 3 on which a base 4 is attached by means of a hexagon socket screws. The contact surface 3 has a threaded bore 5 that lies vertically, i.e. parallel to the piston axis 17, having an inside thread, into which the hexagon socket screw 6 is screwed to hold an alignment part 7 made of brass. To accommodate the screw 6, the alignment part 7 has a three-part continuous bore 8, which consists of an upper part 9 facing the piston crown, having a diameter that is slightly greater than the diameter of the head 12 of the screw 6, of a center part 10 whose diameter is smaller than the diameter of the screw head 12 but greater than the diameter of the screw shaft 13, and of a lower part 11, the diameter of which is greater than the diameter of the center part 10 of the bore 8. The center part 10 of the bore 8 is thereby given the shape of a collar directed inward, on the upper surface of which the screw head rests. In this way, there is room between the lower part 11 of the bore 8 and the screw shaft 13 to accommodate a helical pressure spring 14, the lower end of which rests on the base 4, and the upper end of which lies against the lower surface of the collar 10.

Figure 2:
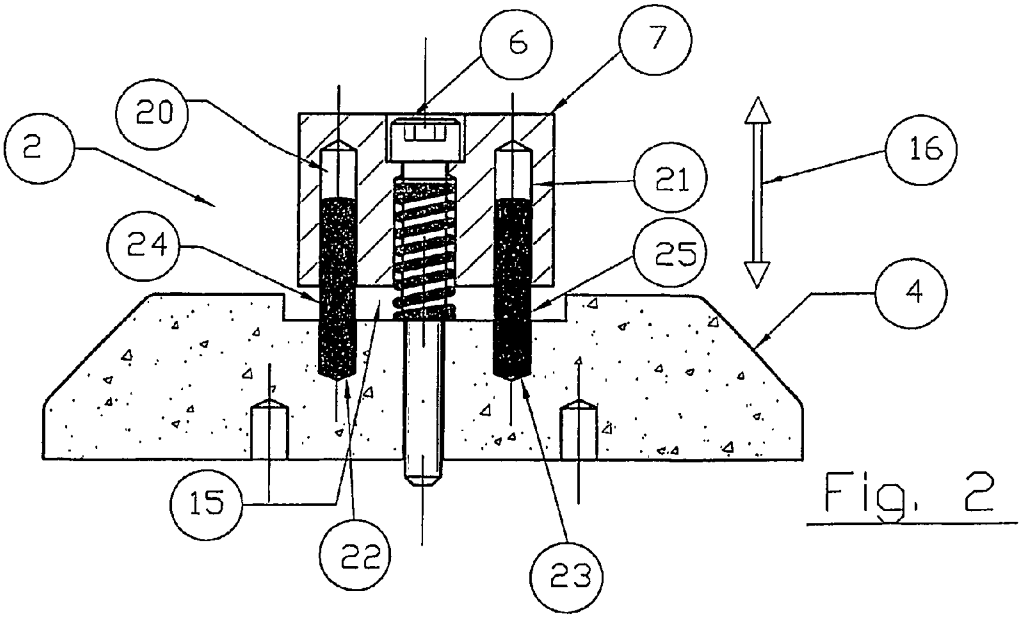

The axial length of the alignment part 7 is dimensioned in such a manner that in the relaxed state of the pressure spring 14, a gap 15 (FIG. 2) occurs between the alignment part 7 and the base 4, and that the alignment part 7 rests on the pressure spring 14 and thereby is mounted in elastically resilient manner, in the direction of the arrow 16 (FIG. 2). Furthermore, the alignment part 7 has surfaces 19 that narrow conically upward, in the section shown in FIG. 1.

The piston 1 is attached to the piston holder 2, in that it is pushed onto the alignment part 7 with slight pressure, in such a manner that the slanted surfaces 19 of the alignment part 7 make contact with the inside surfaces of the pin bosses 18. In this connection, the alignment part 7 gives way elastically for a short time, in the direction of the arrow 16, and the surfaces 19 of the alignment part 7 wedge against the inside surfaces of the pin bosses 18, thereby preventing the piston 1 from turning on the alignment part 7 and being displaced perpendicular to the piston axis 17 relative to the alignment part 7.

The section through the piston holder 2 shown in FIG. 2, along the line II-II in FIG. 1, shows that the alignment part 7, which is movable in the direction of the arrow 16, and the base 4 have dead-end bores 20 to 23 on both sides of the screw 6, whereby the bores 20 and 22, just like the bores 21 and 23, are disposed coaxial to one another, and whereby the pair of bores 20, 22, just like the pair of bores 21, 23, serve for accommodation of a pin 24, 25, in each instance. In this connection, the pins 24 and 25 are firmly fitted into the bores 22 and 23 of the base 4, while the bores 20 and 21 of the alignment part 7 have a slightly greater diameter than the pins 24, 25, so that the alignment part 7 is mounted on the pins 24, 25 so as to move in the direction of the arrow 16.

In the case of a movement of the alignment part 7 in the direction of the arrow 16, the pins 24 and 25 therefore form a precise guide for the alignment part 7. Furthermore, the pins 24 and 25 prevent the alignment part 7 and therefore the piston attached to it from rotating about the axis 17, and from being displaced in the horizontal direction, perpendicular to the axis 17. Both the fixed mounting of the piston 1 on the alignment part 7 and the mounting of the alignment part 7 on the base 4, which prevents rotation and displacement in the horizontal direction, bring with them the advantage that the piston 1 is immovably mounted in the coating system, independent of dimensional tolerances, particularly of the inside surfaces of the pin bosses 18, and that therefore a uniform formation of the layer profile on the piston skirt occurs during electrolytic coating of the piston 1.

REFERENCE SYMBOL LIST

1 piston
2 holder, piston holder, device for holding a piston
3 contact surface
4 base
5 threaded bore
6 hexagon socket screw, screw
7 alignment part

8 bore
9 upper part of the bore 8
10 center part of the bore 8, collar
11 lower part of the bore 8
12 head of the screw 6, screw head
13 screw shaft
14 pressure spring
15 gap
16 arrow
17 piston axis, axis
18 pin boss
19 surfaces
20 to 23 dead-end bore
24, 25 pin

The invention claimed is:

1. A device for holding a piston for an internal combustion engine in a system for coating pistons, which piston has pin bosses disposed on the side facing away from the piston crown and at a distance from one another, the radially inside surfaces of which pin bosses narrow conically in the direction of the piston crown, the device comprising:

an alignment part that is disposed on a contact surface of the device, in an elastically resilient manner, in the direction of an axis, said alignment part having two surfaces that lie opposite one another, and narrow conically in the direction of the axis and pointing away from the contact surface, wherein said surfaces have the same distance from one another and at least approximately the same conicity as the inside surfaces of the pin bosses, wherein during attachment of the piston on the device, the inside surfaces of the pin bosses come to rest against the surfaces of the alignment part, and a base on which the alignment part is held by means of a screw, forming a gap between base and alignment part, wherein the screw is guided in a bore of the alignment part and screwed into a threaded bore of the base, and wherein the bore has a collar directed inward, on an upper surface of which the screw head rests, and on the lower surface of which a helical pressure spring makes contact, the other end of which spring rests on the base, and which spring holds the base at a distance from the alignment part, forming the gap.

2. The device according to claim 1, wherein the alignment part has at least two dead-end bores directed downward, and wherein two dead-end bores directed upward lie opposite these in the base, wherein the opposite dead-end bores are disposed coaxial to one another, and that a pin for guiding the alignment part is disposed in each of the opposite dead-end bores.

3. A device for holding a piston for an internal combustion engine in a system for coating pistons, which piston has pin bosses disposed on the side facing away from the piston crown and at a distance from one another, the radially inside surfaces of which pin bosses narrow conically in the direction of the piston crown, the device comprising:

an alignment part that is disposed on a contact surface of the device, in an elastically resilient manner, in the direction of an axis, said alignment part having two surfaces that lie opposite one another, and narrow conically in the direction of the axis and pointing away from the contact surface, wherein said surfaces have the same distance from one another and at least approximately the same conicity as the inside surfaces of the pin bosses, wherein during attachment of the piston on the device, the inside surfaces of the pin bosses come to rest against the surfaces of the alignment part, wherein the alignment part has at least two dead-end bores directed downward, and wherein two dead-end bores directed upward lie opposite these in the base, wherein the opposite dead-end bores are disposed coaxial to one another, and that a pin for guiding the alignment part is disposed in each of the opposite dead-end bores, wherein the pins are firmly fitted into the bores of the base, and wherein the bores of the alignment part have a diameter greater than that of the pins, by such a dimension that the alignment part is movably mounted on the pins.

* * * * *